(12) United States Patent
Misonou et al.

(10) Patent No.: US 7,077,028 B2
(45) Date of Patent: Jul. 18, 2006

(54) PEDAL RETRACTION AMOUNT CONTROL APPARATUS

(75) Inventors: Yoshimasa Misonou, Wako (JP); Masahide Takada, Wako (JP); Yasuyuki Sekine, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 126 days.

(21) Appl. No.: 10/441,576

(22) Filed: May 19, 2003

(65) Prior Publication Data

US 2003/0221511 A1    Dec. 4, 2003

(30) Foreign Application Priority Data

May 28, 2002    (JP) .............................. 2002-153969

(51) Int. Cl.
*G05G 1/14*    (2006.01)
(52) U.S. Cl. ........................................ 74/512; 180/274
(58) Field of Classification Search ................. 74/512, 74/513, 560, 478; 180/274, 281
See application file for complete search history.

(56) References Cited

U.S. PATENT DOCUMENTS

| 3,828,625 | A | * | 8/1974 | Bruhn, Jr. ..................... 74/512 |
| 6,082,219 | A | * | 7/2000 | Wolpert ....................... 74/512 |
| 6,178,846 | B1 | * | 1/2001 | Specht et al. ................. 74/512 |
| 6,752,038 | B1 | * | 6/2004 | Cordero ....................... 74/512 |
| 2002/0189391 | A1 | * | 12/2002 | Matsumoto et al. .......... 74/512 |

* cited by examiner

*Primary Examiner*—Vicky A. Johnson
(74) *Attorney, Agent, or Firm*—Hamre, Schumann, Mueller & Larson, P.C.

(57) ABSTRACT

A pedal retraction amount control apparatus is provided in which a tread portion of a pedal can be reliably moved in a forward direction of a vehicle body, when the running vehicle collide in various forms. The pedal retraction amount control apparatus comprises a pushing member 24 which can protrude into a passenger compartment 12 from a forward side of the vehicle, and a control bracket 45 arranged between the pushing member 24 and a pedal 17, which rocks by being pushed by the pushing member 24 moving to rearward of the vehicle so as to press an upper part of the pedal 17 above a pivot 38 in the rearward direction of the vehicle, and the tread portion of the pedal is moved to the forward of the vehicle.

7 Claims, 9 Drawing Sheets

PEDAL RETRACTION AMOUNT CONTROL APPARATUS

BACKGROUND OF THE INVENTION

1. Field of the Invention

The present invention relates to a pedal retraction amount control apparatus for a running vehicle.

2. Description of the Related Art

As a pedal retraction amount control apparatus for a running vehicle, there is for example, an apparatus disclosed in Japanese Patent Application, First Publication No. Hei 10-512518. The apparatus disclosed in the publication has a pushing member, which can protrude into a passenger compartment from the forward side of a vehicle, and a pedal is supported by a support member, which bridges between two pillars and which also supports a steering, and a rear end of the pushing member faces a pivot located above the tread portion. This apparatus rotates the pedal to move the tread portion in the forward direction of the vehicle, by moving the pushing member to the rearward of the vehicle so as to protrude into the passenger compartment at the moment of a head-on collision of the vehicle, wherein a power unit provided in the front portion of the vehicle moves toward the rearward direction, which results in the pushing member contacting the upper part of the pedal above the pivot so as to press the upper part of the pedal toward the rearward side of the vehicle.

However, there are various forms of collision of a running vehicle, and because these are not limited to the pushing member moving along the longitudinal direction of the vehicle. For example, when the pushing member moves in a inclined state along the longitudinal direction, the pushing member cannot press the upper part of the pedal, and the tread portion of the pedal is thus cannot be moved in the forward direction of the vehicle.

SUMMARY OF THE INVENTION

Consequently, the object of the present invention is to provide a pedal retraction amount control apparatus in which the tread portion of the pedal can be reliably moved toward in the forward direction of the vehicle at any types of collision of a running vehicle.

In order to achieve the above objective, a pedal retraction amount control apparatus according to a first aspect of the present invention comprising a pushing member (for example the push rod 24 in the embodiment) which can protrude into the passenger compartment (for example the passenger compartment 12 in the embodiment) rearward, and a control bracket (for example the control bracket 45 in the embodiment) is arranged between the pushing member and a pedal tread portion (for example the clutch pedal 17 in the embodiment), which rocks by being pushed by the pushing member moving in a rearward direction of the vehicle, to press an upper part of the pedal above a pivot thereof (for example the pivot 38 in the embodiment) in the rearward direction of the vehicle.

As a result, naturally if the pushing member is moved from front side to the rearward direction, and even if the pushing member is moved rearward in a condition inclined to the longitudinal direction, the control bracket provided between the pushing member and the pedal receives the pushing member in a surface contact state. Therefore, the control bracket reliably receives movement of the pushing member moving in the rearward direction of the vehicle and rocks, and pushes an upper part of the pedal above the pivot in the rearward direction of the vehicle to move the tread portion of the pedal in the forward direction of the vehicle. Also, because the control bracket receives the pushing member in the surface contact state, the pressing force of the pushing member can be transmitted to the pedal even if the positional relationship between the pedal and the pushing member were displaced.

In a pedal retraction amount control apparatus according to the second aspect of the present invention, and related to that of the first aspect, the pushing member is connected to a component (for example the damper housing 25 in the embodiment) placed in the front side of the vehicle.

As a result, in the case where the vehicle has a head-on collision, when the component in the forward side of the vehicle moves in the rearward direction of the vehicle, the pushing member also moves in the rearward direction, and the control bracket provided between the pushing member and the pedal reliably receives this movement of the pushing member and rocks, and presses the upper part of the pedal above the pivot in the rearward direction of the vehicle to move the tread portion of the pedal in the forward direction of the vehicle.

In a pedal retraction amount control apparatus according to a third aspect of the present invention and related to that of the second aspect, the component in the forward side of the vehicle is a damper housing, and the pushing member is connected to an inner side surface at the center in the crosswise direction of the damper housing.

As a result, since the pushing member is unlikely to be deformed by an influence of panel deformation at the time of a head-on collision of the vehicle, the pushing member can reliably move the control bracket in the rearward direction of the vehicle. Especially in the case of a offset collision where the vehicle is collided at an offset position to one side in the crosswise direction, when the damper housing provided on the same side moves in the rearward direction of the vehicle, the pushing member also moves in the rearward direction of the vehicle, and the control bracket provided between the pushing member and the pedal reliably receives this movement of the pushing member, and rocks, pressing the upper part of the pedal above the pivot in the rearward direction of the vehicle to move the tread portion of the pedal in the forward direction of the vehicle.

In a pedal retraction amount control apparatus according to the fourth aspect of the present invention, and also related to those of the first to the third aspects, between the pedal and the control bracket, engaging portions (for example the engaging notch 43 and an engaging convex part 58 in the embodiment) are formed which engage with each other in a state where the control bracket rocks and presses the upper part of the pedal above the pivot thereof.

As a result, when the pushing member moves in the rearward direction of the vehicle, rocks the control bracket, and presses a part of the pedal above the pivot in the rearward direction of the vehicle to move the tread portion of the pedal in the forward direction of the vehicle, the pedal and the control bracket are engaged by the engaging portions so that the state in which rotation of the pedal is restricted results.

A pedal retraction amount control apparatus according to the fifth aspect of the present invention, and also related to those of the first through fourth aspects, comprises the control bracket attached to a support bracket (for example the support bracket 33 in the embodiment) which rotatably supports the pedal.

In this way, because the control bracket is attached to a support bracket which rotatably supports the pedal, the support bracket and the control bracket can be assembled in the vehicle at one time by pre-attaching the control bracket to the support bracket.

In a pedal retraction amount control apparatus according to the sixth aspect of the present invention, and also related to those of the first through fifth aspects, the control bracket comprises a engaging section (for example the engaging section 46 in the embodiment), an upper part of the control bracket is supported in a cantilevered state to a dash panel (for example the dash lower panel 10 in the embodiment), and a push section (for example the push section 47 in the embodiment) which faces the upper part of the pedal above the pivot thereof.

Since the upper part of the control bracket is secured to the dash panel in a cantilevered condition by means of the engaging section thereof, the simple jointing structure makes it possible to rock the control bracket.

A pedal retraction amount control apparatus according to the seventh aspect of the present invention, and also related to those of the first through sixth aspects, comprises a through hole (for example the through hole 19 in the embodiment) is formed in the dash panel (for example the dash lower panel 10 in the embodiment), through which the pushing member is passed, and a cover member (for example the plug 20, the cap 65, or the ring member 66 in the embodiment) which closes off a gap between the through hole and the pushing member.

In this way, because the pushing member is passed through the through hole formed in the dash panel, the pushing member can be easily moved in the rearward direction of the vehicle. Also, because the cover member which seal the gap between the through hole and the pushing member, the engine room and the passenger compartment can be sealed from each other, so that a decrease in air conditioning performance can be prevented, noise can be sealed, and a reduction in watertightness can be prevented.

In a pedal retraction amount control apparatus according to the eighth aspect of the present invention, and also related to that of the seventh aspect, the cover member comprises a resilient member.

Because the cover member comprises a soft resilient member, vibration passing through the pushing member is absorbed by the cover member, and the transmission of the vibration to the passenger compartment side can be suppressed. In addition, because of adhesion of the cover member with the dash panel there is a waterproofing function, and mounting is simplified.

In a pedal retraction amount control apparatus according to the ninth aspect of the present invention, and also related to that of the seventh aspect, the cover member comprises a frangible member, and has clearance between itself and the pushing member.

Because the cover member comprises a frangible member, it can be attached by welding or the like. Also, because the cover member has clearance between itself and the pushing member, transmission of vibration propagated through the pushing member to the passenger compartment side through the cover member can be prevented.

DETAILED DESCRIPTION OF THE INVENTION

A first embodiment of a pedal retraction amount control apparatus of the present invention will be explained with reference to FIG. 1 through FIG. 6.

Figure 1:
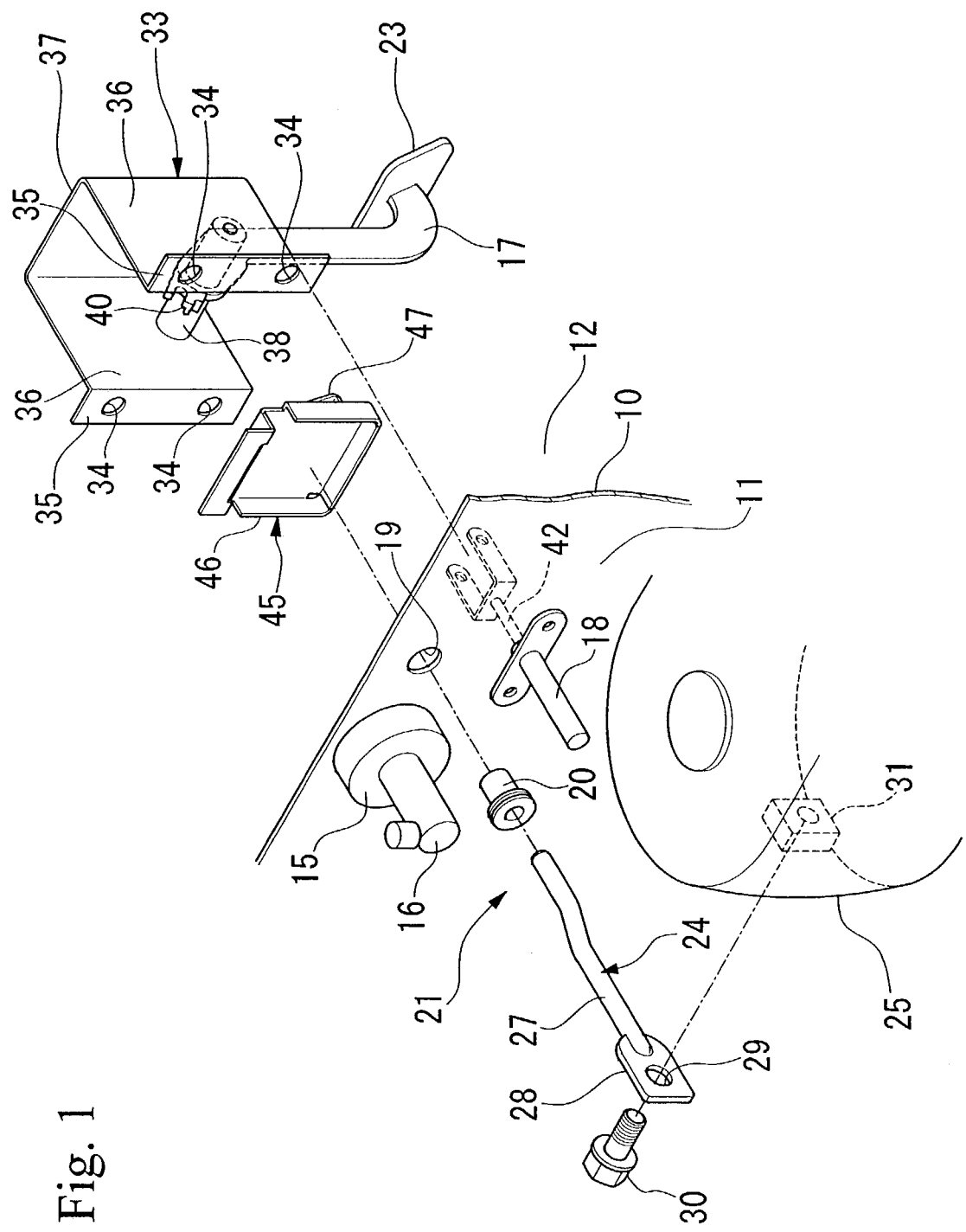
FIG. 1 is a disassembled perspective view showing a pedal retraction amount control apparatus according to a first embodiment of the present invention.

In FIG. 1 reference symbol 10 denotes a dash lower panel which partitions an engine room 11 on a forward side of the vehicle, in which a power unit (not shown in the figure) is arranged, from a passenger compartment 12 on a rearward side which houses the crew.

A brake booster 15 which reinforces the input of a brake pedal (not shown in the diagram), is attached to the dash lower panel 10 in the engine room 11, and a master cylinder 16 which generates brake hydraulic pressure in response to the output of the brake booster 15 is attached to the brake booster 15. Furthermore, a clutch cylinder 18 which generates clutch hydraulic pressure by means of input to a clutch pedal 17, is attached to the dash lower panel 10 on the engine room 11 side, approximately adjacent to the brake booster 15 and the master cylinder 16 on the left side in the crosswise direction of the vehicle.

A through hole 19 is formed in the dash lower panel 10 above the clutch cylinder 18, and in this through hole 19, a bottomed approximately cylindrical resilient member, specifically a rubber plug 20, is attached with the bottom side positioned on the passenger compartment 12 side.

The first embodiment of the pedal retraction amount control apparatus 21 moves a tread 23 side of the clutch pedal 17 from the passenger compartment 12 in the forward direction of the vehicle at the moment of head-on collision of the vehicle, and has a push rod 24 (pushing member) which is able to protrude from the engine room 11 in the forward side of the vehicle into the passenger compartment 12.

The push rod 24 is inserted into the plug 20, while the front end of the push rod 24 in the longitudinal direction of the vehicle is connected to the inner side surface at the center of the crosswise direction, that is, the power unit side of a damper housing (the forward side component) 25 on the driver's side (on left in the figure) in the crosswise direction of the vehicle of the damper housings to which suspension dampers (not shown) installed in the engine room 11 are attached, and, whereas, the rear end of the push rod 24 is inserted while being inserted through the through hole 19. That is, the push rod 24 is formed by a flat plate shaped mount 28 connected at the front end of a rod 27. An opposite end of the rod 27 to the mount 28 is inserted into the plug 20, a bolt 30 is inserted into a through hole 29 formed in the mount 28, and the bolt 30 is connected to the damper housing 25 by screwing into a nut member 31 which is secured by welding or the like to the damper housing 25. The plug 20 closes a gap between the through hole 19 and the push rod 24.

The clutch pedal 17 is attached to the passenger compartment 12 side of the dash lower panel 10 through a support bracket 33.

The support bracket 33 comprises a pair of mounting plates 35 on the left and right which are fastened to the dash lower panel 10 by bolting to two mounting holes 34 on the top and bottom on both sides, a pair of support plates 36 on the left and right which extend in the rearward direction of the vehicle from the inner edge of these mounting plates 35, and a connecting plate 37 which connects the rear edges of the left and right pair of support plates 36. A pivot 38, which is the center of rotation of the clutch pedal 17, is rotatably supported on the left and right pair of support plates 36 in a condition perpendicular to these support plates 36.

Figure 2:
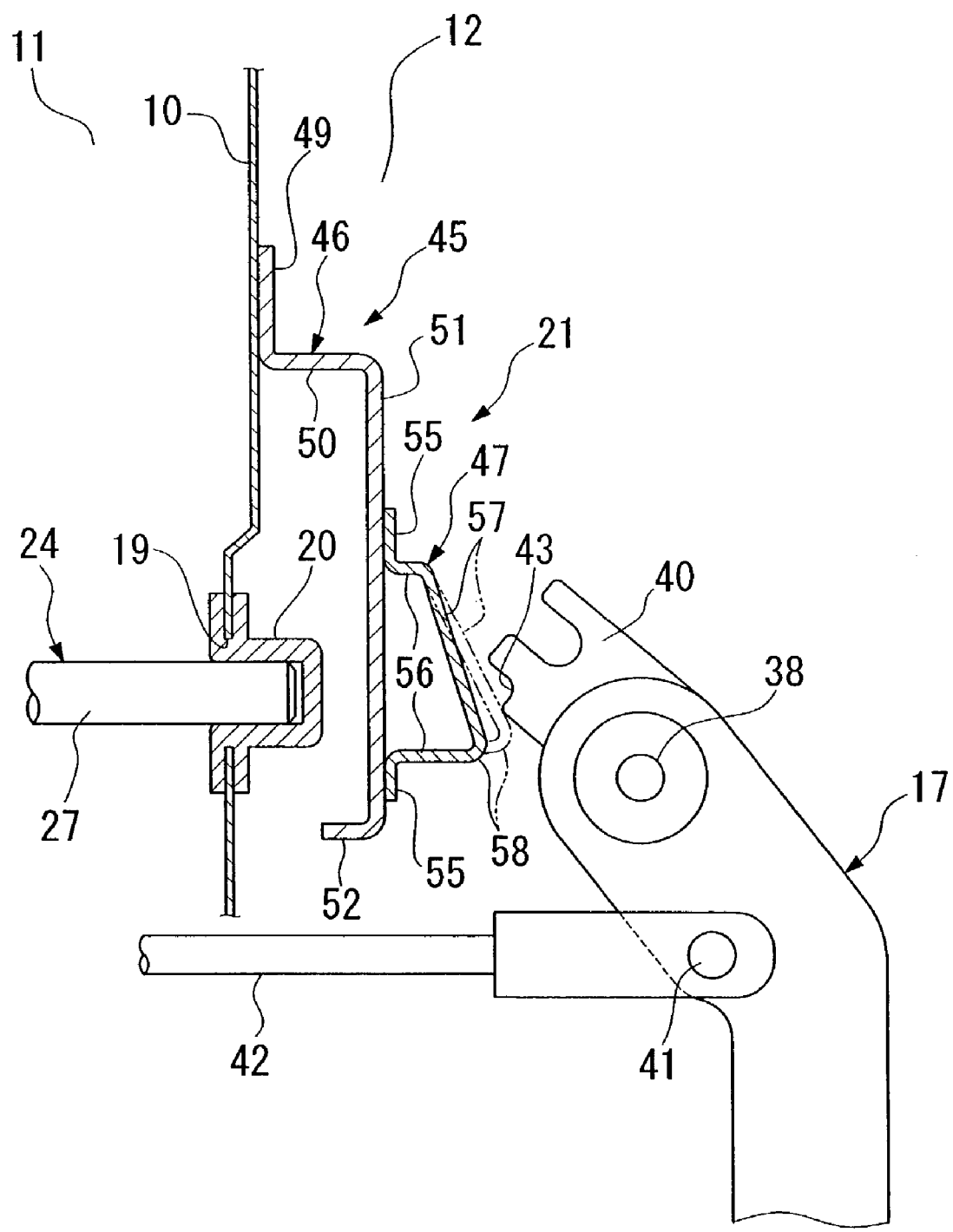
FIG. 2 is a side section view showing the pedal retraction amount control apparatus according to the first embodiment of the present invention.

On the clutch pedal 17, which is supported on the support bracket 33 so as to be rotatable about the pivot 38, which lies along the crosswise direction of the vehicle, is formed a tread portion 23 extending downwards from the pivot 38 facing the rearward direction of the vehicle. Furthermore, as shown in FIG. 2, the clutch pedal 17 has an upper extension 40, which extends upward from the pivot 38. Moreover, a clutch rod 42, which is the input shaft for the clutch cylinder 18, is rotatably connected to the clutch pedal 17 on a supporting shaft 41, which extends in the crosswise direction of the vehicle and provided on the lower side of the pivot 38. In addition, a single-step recessed engaging notch (engaging portion) 43 is formed in the upper edge of the upper extension 40, on the forward side of the vehicle.

Moreover, in the pedal retraction amount control apparatus 21 of the first embodiment, a control bracket 45 is provided between the rear end of the pushrod 24 located in the longitudinal direction and the part of the clutch pedal 17 above the pivot 38, which rocks due to being pressed by the push rod 24 moving in the rearward direction of the vehicle, to press the upper extension 40 of the clutch pedal 17 above the pivot 38 in the rearward direction of the vehicle.

Figure 3:
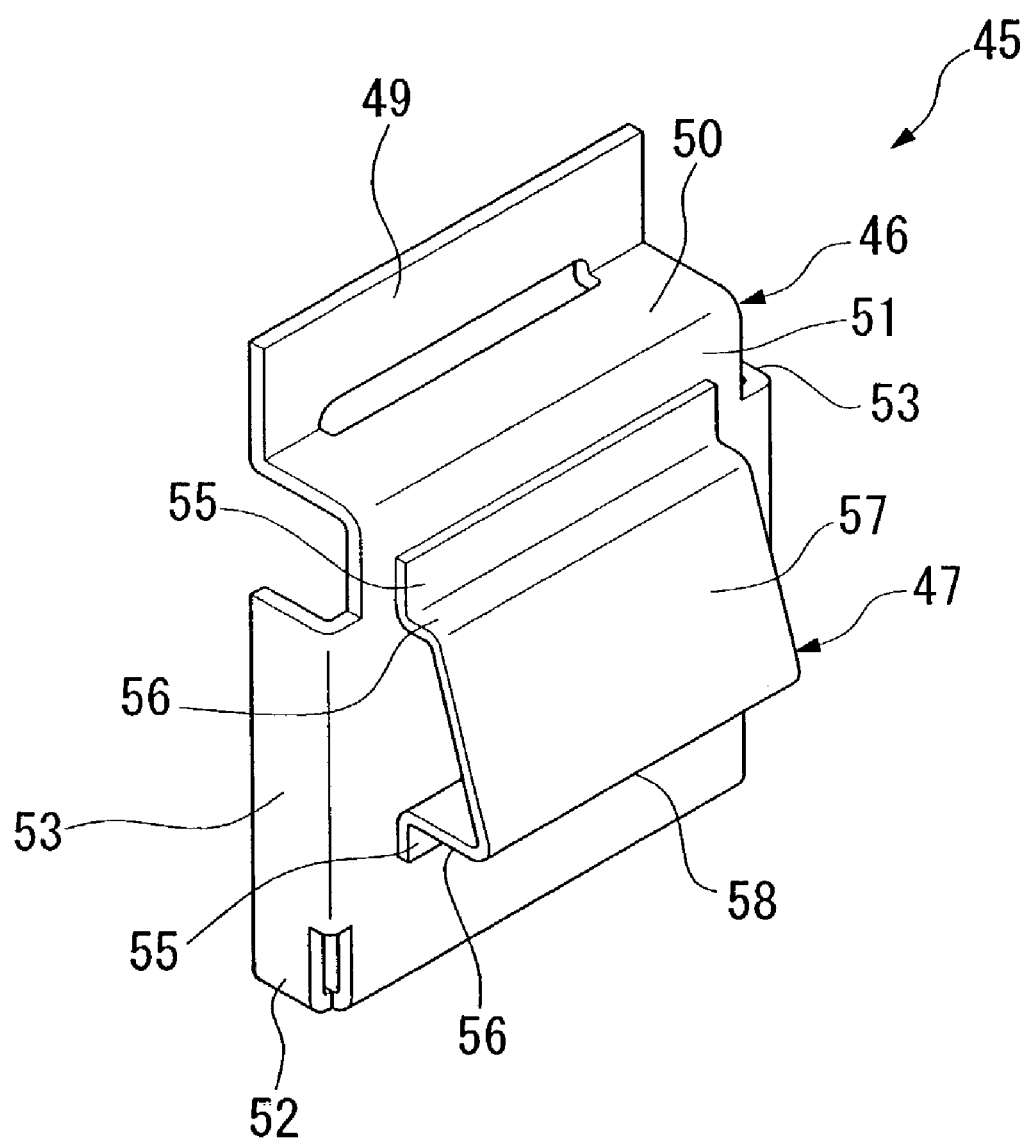
FIG. 3 is a perspective view showing a control bracket of the pedal retraction amount control apparatus according to the first embodiment of the present invention.

As shown in FIG. 3, this control bracket 45 has an engaging section 46, and a push section 47, which is secured to the engaging section 46.

The engaging section 46, having only a mounting plate 49 of an upper edge section secured to the dash lower panel 10 by welding or the like in a cantilevered state, is press-formed from a single sheet of plate material in a shape having; the mounting plate 49, a rear extension plate 50 extending from a lower edge of the mounting plate 49 in the rearward direction of the vehicle (to the passenger compartment 12 side), a main plate 51 which extends downwards from the rear edge of the rear extension plate 50, a front plate 52 which extends in the forward direction of the vehicle from a lower edge of the main plate 51, and a pair of side plates 53 on the left and right which extend in the forward direction of the vehicle from the left and right side edges of the main plate 51. Here, the corners of each side plate 53 and the front plate 52 are connected. As a result, the engaging section 46 forms a shape in which the plates extend in the forward direction of the vehicle from all the edges of the square main plate 51, thus forming a shape which can reliably receive the backwards movement of the push rod 24. The main plate 51 has a surface area much wider than the cross section of the push rod 24 perpendicular to the axis.

The push section 47 which is secured by a pair of mounting plates 55 at the top and bottom to the rear of the chassis (passenger compartment 12 side) of the main plate 51 by welding or the like, is press-formed from a single sheet of plate material in a shape having; the mounting plates 55, a pair of rear extension plates 56 which extend from the upper edge of the lower mounting plate 55 and the lower edge of the upper mounting plate 55 respectively in the rearward direction of the vehicle, and an inclined plate 57 which connects between the rear edges of the rear extension plates 56 and is inclined so as to be positioned lower as it advances rearward of the vehicle.

The control bracket 45 is secured to the dash lower panel 10 as described above only by the mounting plate 49 on the upper edge of the engaging section 46, and in this secured state, is provided so as to be spaced in between the push rod 24 and the clutch pedal 17, and furthermore is provided so that the position of the vertical middle part and the transverse middle part of the main plate 51 of the engaging section 46 are aligned with the push rod 24. Moreover, the control bracket 45 is arranged so that the inclined plate 57 of the push section 47 faces towards the upper extension 40 of the clutch pedal 17, and so that when swung in the rearward direction of the vehicle while deforming about the boundary between the mounting plate 49 of the engaging section 46 and the rear extension plate 50, it contacts with the front of the upper extension 40 of the clutch pedal 17 mainly at the inclined plate 57 of the push section 47. In addition, the control bracket 45 is arranged so as to engage the engaging convex part 58 formed at the boundary between the rear extension 56 at the lower side of the push section 47 and the inclined plate 57, into the engaging notch 43 of the clutch pedal 17, in a state where the control bracket 45 is swung further so that the upper extension 40 is moved in the rearward direction of the vehicle.

Figure 4:
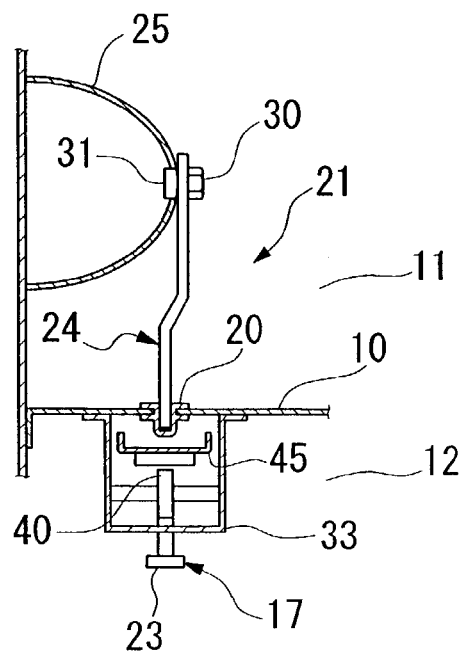
FIG. 4 is a plane section view showing schematically a normal condition of the pedal retraction amount control apparatus according to the first embodiment of the present invention.
Figure 5:
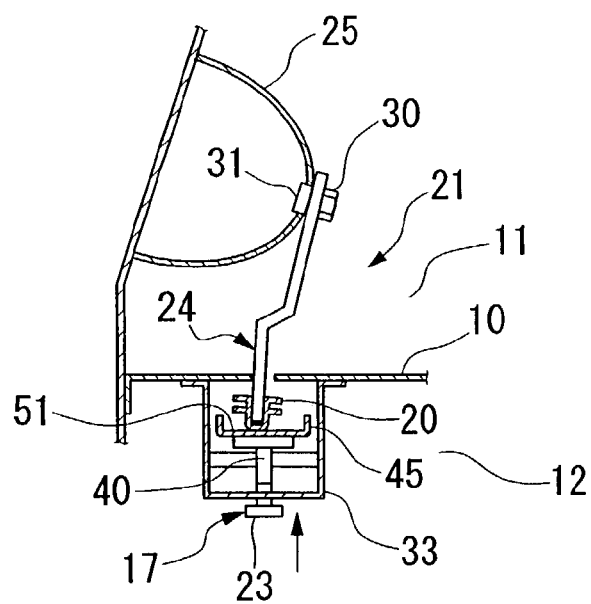
FIG. 5 is a plane section view showing schematically a state of the pedal retraction amount control apparatus according to the first embodiment of the present invention, at the time of a vehicle collision.
Figure 6:
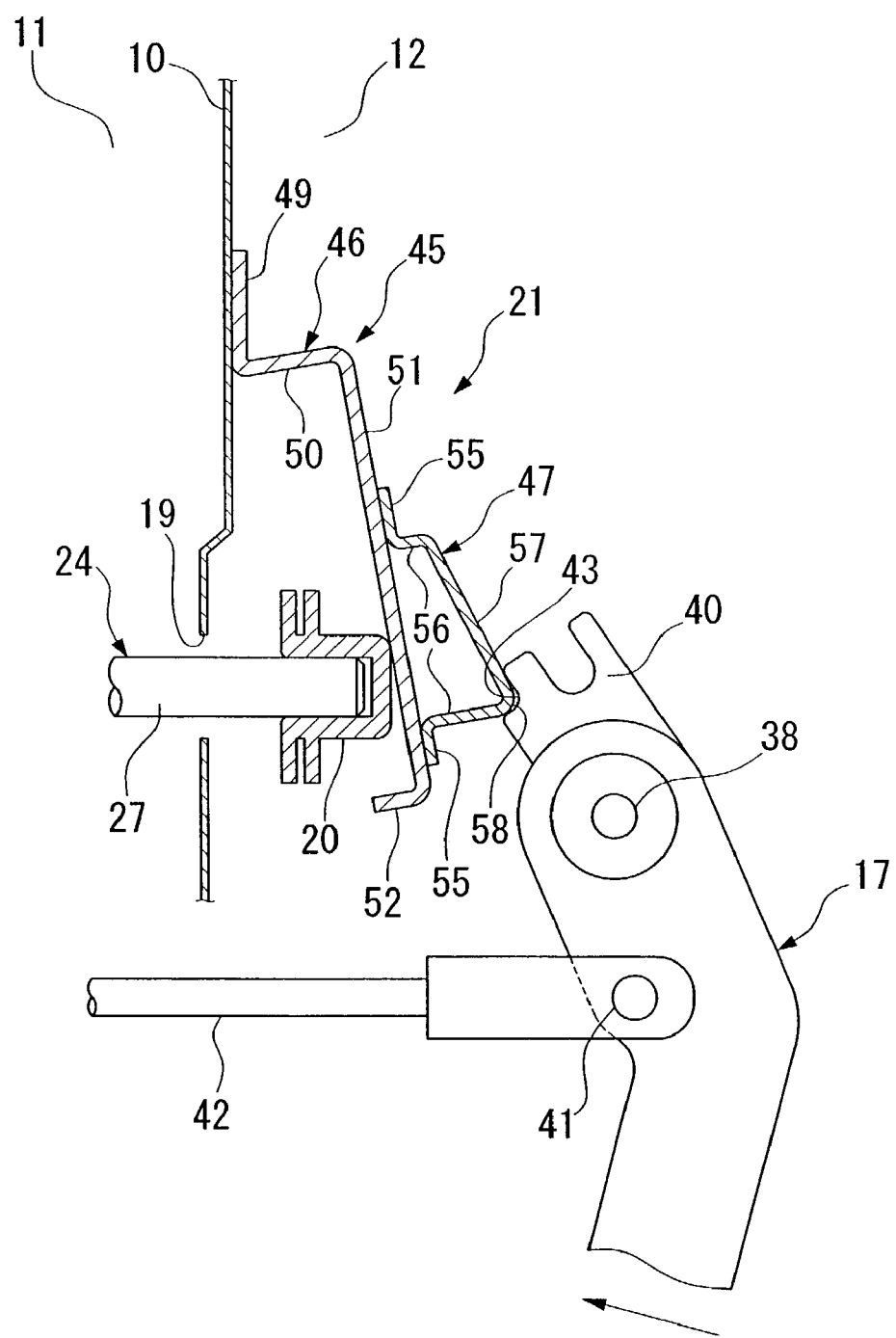
FIG. 6 is a side view showing a state of the pedal retraction amount control apparatus according to the first embodiment of the present invention, at the time of a vehicle collision.

In the first embodiment described above, when the damper housing 25 moves in the rearward direction of the vehicle, as shown in FIG. 4 and FIG. 5, for example, in a situation where an head-on collision is an offset collision offset towards the driver's seat side in the crosswise direction of the vehicle, in which there is a particularly high possibility of exerting an influence on the pedal on the driver's seat side, the push rod 24 also moves in the rearward direction of the vehicle, and while the push rod 24 is separating the plug 20 from the dash lower panel 10, it moves in the rearward direction of the vehicle so that the amount of protrusion into the passenger compartment 12 side increases. As a result, the push rod 24 contacts the main plate 51 of the control bracket 45, and presses the main plate 51 in the rearward direction of the vehicle. When this happens, as shown in FIG. 6, the control bracket 45 rocks in the rearward direction of the vehicle while being distorted so as to bend about the boundary between the mounting plate 49 secured to the dash lower panel 10 and the rear extension plate 50 which extends in the rearward direction of the vehicle from the mounting plate 49, so that the inclined plate 57 contacts the front of the upper extension 40 of the clutch pedal 17 to press it in the rearward direction of the vehicle. As a result, the upper extension 40 of the clutch pedal 17 on the upper side of the pivot 38, is pushed in the rearward direction of the vehicle, so that the clutch pedal 17 rotates about the pivot 38 in a direction such that the tread 23 portion rotates in the direction to evacuate from the passenger compartment 12.

At this time, because the control bracket 45 is provided so that the position of the vertical middle part and the transverse middle part of the main plate 51 match the push rod 24, then naturally, if the push rod 24 moves in the rearward direction of the vehicle in a condition from the forward to the rearward direction, and even if it moves in the rearward direction of the vehicle in a condition inclined in the longitudinal direction of the vehicle, the control bracket 45 provided between the push rod 24 and the clutch pedal 17 receives the push rod 24 in the surface contact state. Therefore, the control bracket 45 reliably receives the movement of the push rod 24 in the rearward direction of the vehicle and rocks, and pushes the upper part above the pivot 38 of the clutch pedal 17, to move the tread 23 side of the clutch pedal 17 in the forward direction of the vehicle. Consequently, the tread 23 portion of the clutch pedal 17 can be reliably moved in the forward direction of the vehicle, irrespective of collision forms of the running vehicle. Here, because the corners between each side plate 53 and the front plate 52 are connected, the control bracket 45 also prevents relief of the push rod 24 from corners.

Also, because the control bracket 45 receives the push rod 24 in the surface contact state, then even if the relative position between the clutch pedal 17 and the push rod 24 shifts up and down or left to right, the pressure of the push rod 24 can be transmitted to the clutch pedal 17. As a result the degree of freedom in the positioning between the clutch pedal 17 and the push rod 24 can be increased.

Moreover, because the push rod 24 is connected to the damper housing 25 on the driver's seat side in the crosswise direction of the vehicle, it is unlikely to be influenced by panel deformation at the moment of a head-on collision of the vehicle, and the force can be reliably transmitted to the control bracket by moving the push rod 24 in the rearward direction of the vehicle. Especially in the case of an offset head-on collision as mentioned previously which has a large influence on the clutch pedal 17 on the driver's seat side, the push rod 24 can be reliably moved in the rearward direction of the vehicle as mentioned above. As a result, the tread portion 23 of the clutch pedal 17 can be reliably moved in the forward direction of the vehicle. It is of course, provided the collision is such as to move the push rod 24 backwards, then for all collisions, the tread portion 23 of the clutch pedal 17 can be reliably moved in the forward direction of the vehicle.

In addition, when the push rod 24 moves in the rearward direction of the vehicle, rocks the control bracket 45, and pushes the upper extension 40 of the clutch pedal 17 to move the tread portion 23 of the clutch pedal 17 in the forward direction of the vehicle, then as shown in FIG. 6, the engaging convex part 58 of the control bracket 45 engages with the engaging notch 43 of the clutch pedal 17, and restricts the rotation of the clutch pedal 17. Consequently, the clutch pedal 17 no longer returns to the passenger compartment 12 side after a collision.

Moreover, regarding the control bracket 45, because in the engaging section 46, the upper part is secured to the dash lower panel in a cantilevered condition, rocking can be enabled with a simple joining structure.

In addition, because the push rod 24 is passed through the through hole 19 formed in the dash lower panel 10, the push rod 24 can be easily moved in the rearward direction of the vehicle. Also, because there is provided the plug 20 which closes off the gap between the through hole 19 and the push rod 24, the engine room 11 and the passenger compartment 12 can be closed off from each other, so that degradation of an air conditioning performance can be prevented, noise can be blocked out, and a reduction in watertightness can be prevented. Also, because the plug 20 comprises a soft resilient member, vibration passing through the push rod 24 is absorbed by the plug 20 and the transmission of the vibration to the passenger compartment 12 side can be suppressed. In addition, because of adhesion of the plug 20 with the dash lower panel 10 a waterproofing function is generated, and mounting is simplified.

Figure 7:
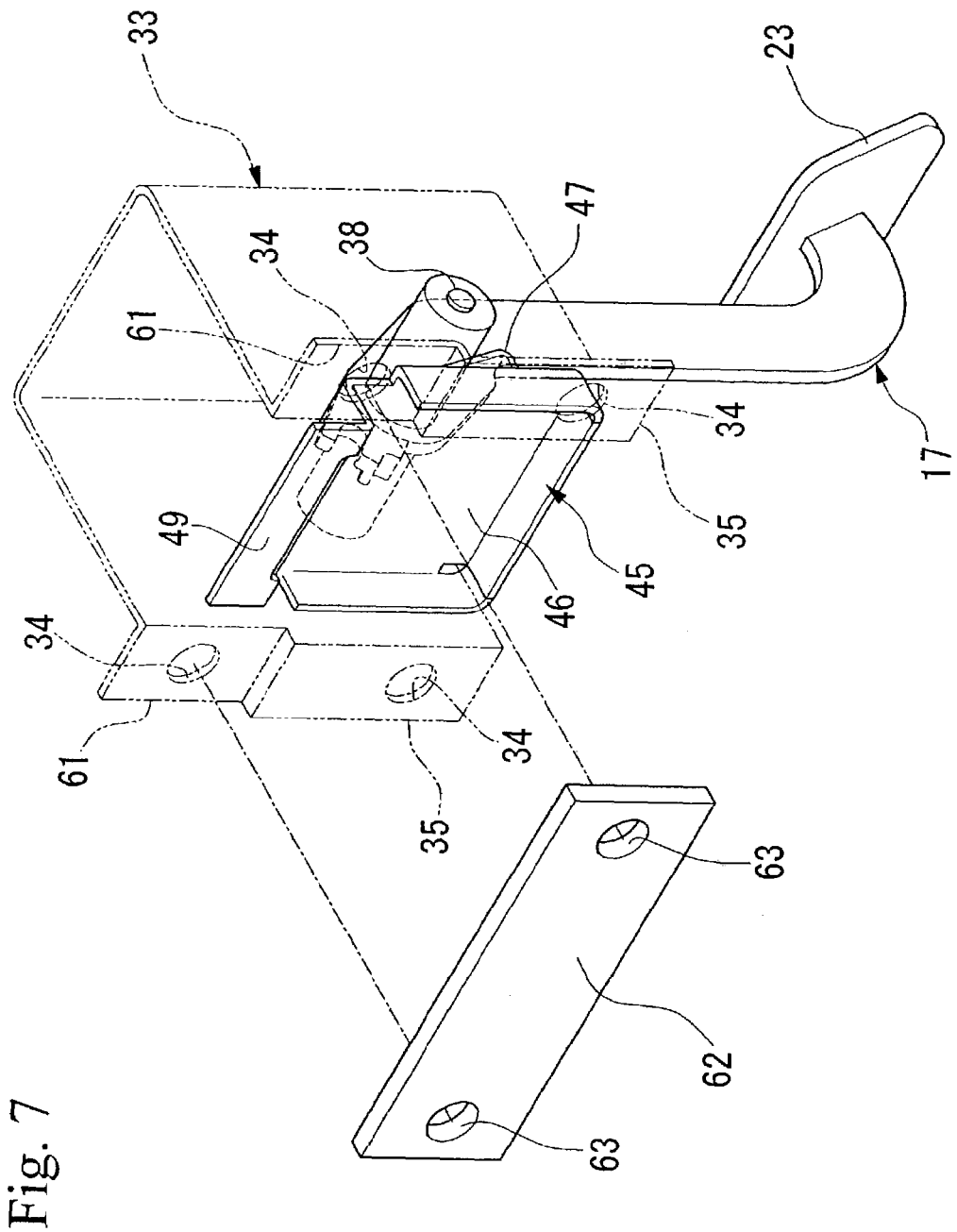
FIG. 7 is a disassembled perspective view showing a control bracket and support bracket and so on of a pedal retraction amount control apparatus according to a second embodiment of the present invention.
Figure 8:
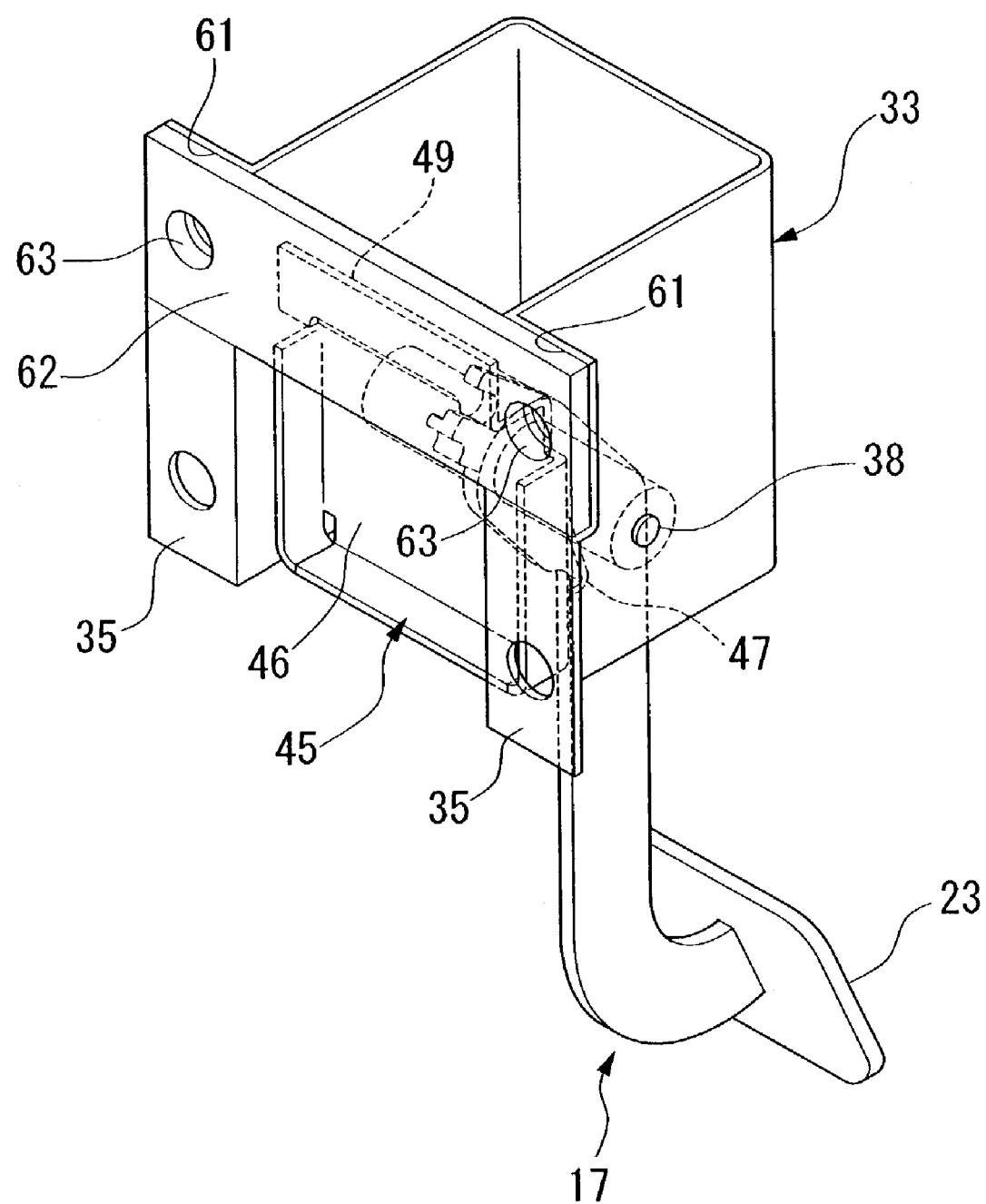
FIG. 8 is a perspective view showing a control bracket and support bracket and so on of the pedal retraction amount control apparatus according to the second embodiment of the present invention.

A second embodiment of a pedal retraction amount control apparatus 21 of the present invention will be described mainly with reference to FIG. 7 and FIG. 8, centering on the differences from the first embodiment. Parts the same as in the first embodiment are denoted by the same reference symbols, and description is omitted.

In the first embodiment, the description took as an example, the case where the control bracket 45 was attached to the dash lower panel 10, separate to the support bracket 33 rotatably supporting the clutch pedal 17. However, in the second embodiment, as shown in FIG. 7 and FIG. 8, the control bracket 45 is provided integrally with the support bracket 33.

That is to say, single-step recessed concave sections 61 are formed in the upper section of the mounting plates 35 on both sides of the support bracket 33, and a support plate 62 is secured by welding or the like to these concave sections 61, so as to connect the left and right mounting plates 35 together. Furthermore, the upper side mounting holes 34 are formed within the concave sections 61, and mounting holes 63 are also formed on the support bracket 62 as well to match the positions of the mounting holes 34 on the left and right sides. Moreover, as shown in FIG. 8, the mounting plate 49 of the above mentioned control bracket 45 is secured by welding or the like to the clutch pedal 17 of this support bracket 62. Here, the support bracket 33, the clutch pedal 17, the support plate 62, the control bracket 45 and so on, are integrally pre-assembled as a clutch pedal assembly.

In such a second embodiment, obviously the same effects as for the first embodiment are demonstrated. In addition, because the control bracket 45 is attached to the support bracket 33 which rotatably supports the clutch pedal 17, the support bracket 33 and the control bracket 45 can be assembled to the body of the vehicle at one time by pre-attaching the control bracket 45 to the support bracket 33. Consequently, man hours for assembly can be reduced.

Figure 9:
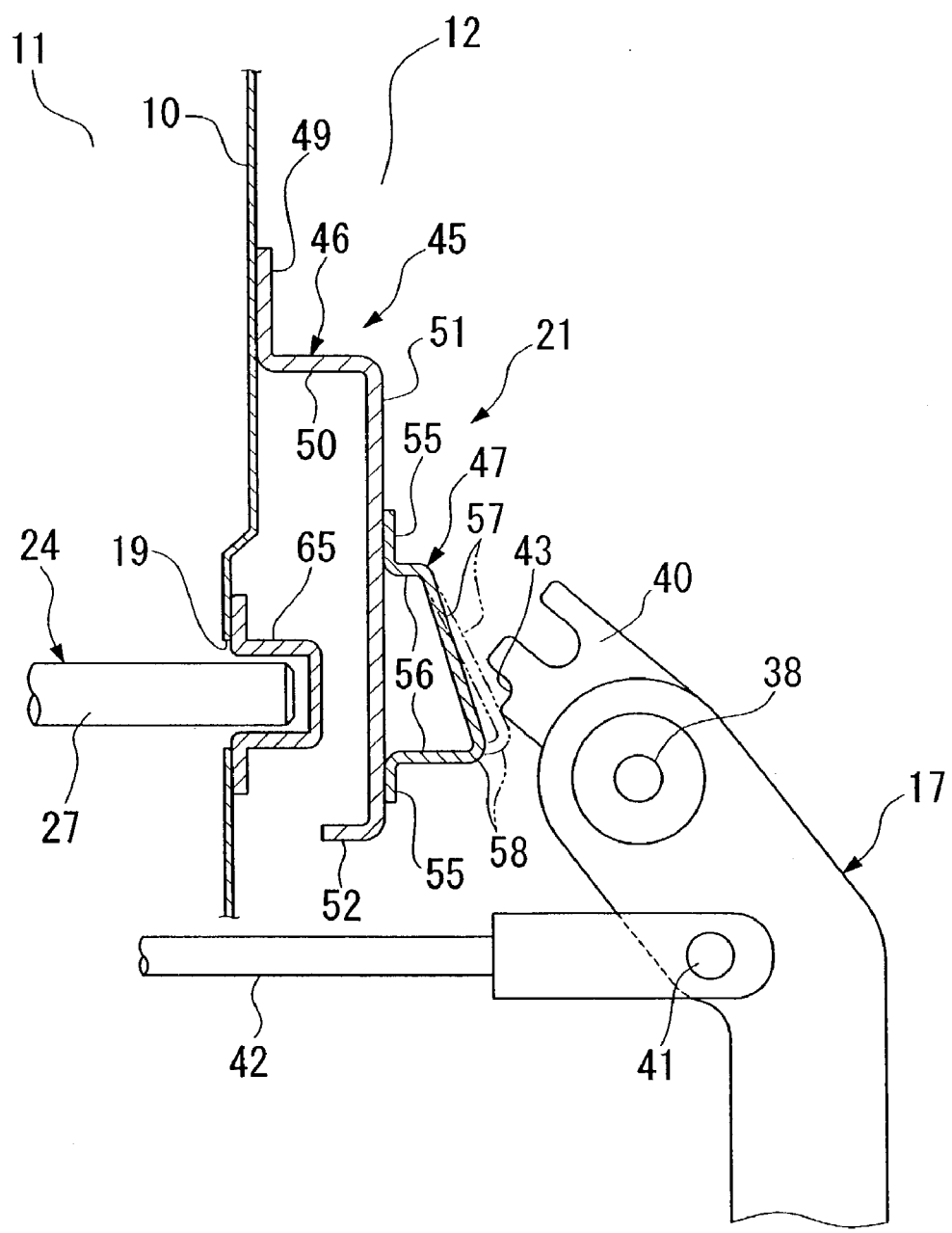
FIG. 9 is a side section view showing a pedal retraction amount control apparatus according to a third embodiment of the present invention.

A third embodiment of a pedal retraction amount control apparatus 21 of the present invention will be described mainly with reference to FIG. 9, centering on the differences from the first embodiment. The same parts as those used in the first embodiment are denoted by the same reference symbols, and description is omitted.

In the third embodiment, as a cover member to close the gap between the through hole 19 and the push rod 24, instead of the plug in the first embodiment, a cap 65 comprising a frangible metal member which is an easily breakable by the push rod 24 which moves at the moment of head-on collision of the vehicle, is secured by welding or the like to the passenger compartment 12 side of the dash lower panel 10. This cap 65 has a clearance between itself and the push rod 24.

According to such a third embodiment, because the gap between the through hole 19 and the push rod 24 is closed by the cap 65 formed from the frangible metal member, the cap 65 can be easily secured to the dash lower panel 10 by welding or the like. Also, because the cap 65 has a clearance between itself and the push rod 24, transmission of vibration propagated through the push rod 24, to the passenger compartment 12 through the cap 65 can be prevented.

Figure 10:
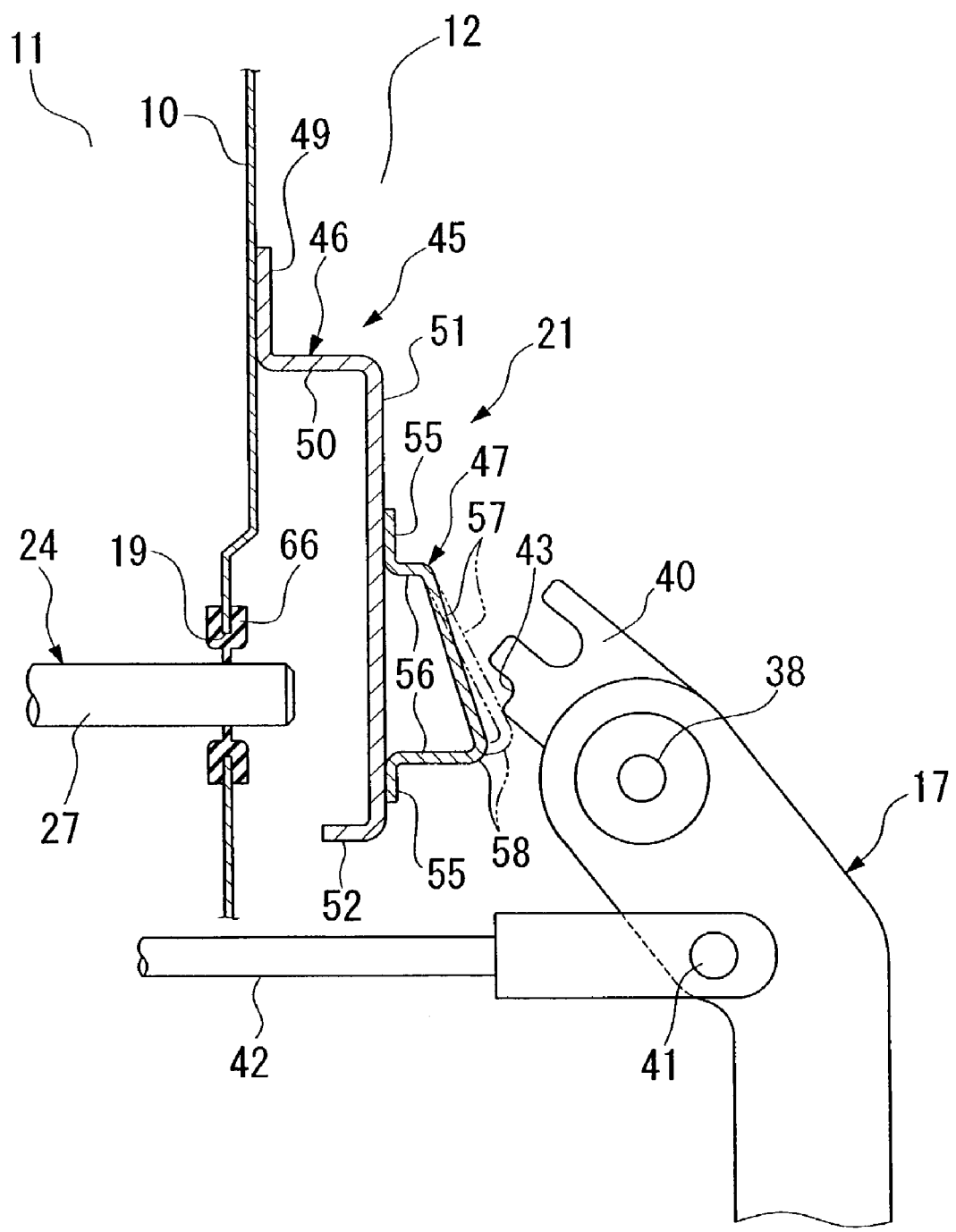
FIG. 10 is a side section view showing a pedal retraction amount control apparatus according to a fourth embodiment of the present invention.

A fourth embodiment of a pedal retraction amount control apparatus 21 of the present invention will be described mainly with reference to FIG. 10, centering on the differences from the first embodiment. Parts the same as in the first embodiment are denoted by the same reference symbols, and description is omitted.

In the fourth embodiment, as a cover member to close the gap between the through hole 19 and the push rod 24, instead of the plug in the first embodiment, a resilient member, specifically a rubber ring member 66, is fitted into the through hole 19 in the dash lower panel 10.

According to such a fourth embodiment, because the gap between the through hole 19 and the push rod 24 is closed by the ring member 66 made of the same resilient material as in the first embodiment, the same effects as those of the first embodiment can be obtained.

The above description shows an example of a pedal retraction amount control apparatus 21 that moves the tread portion 23 of the clutch pedal 17 in the forward direction of the vehicle. However, in a construction where, by exchanging the clutch pedal 17 for a brake pedal, the control bracket is provided between the push rod and the brake pedal, it is possible to construct a pedal retraction amount control apparatus which presses the control bracket with the push rod at the moment of collision, and moves the tread portion of the brake pedal in the forward direction of the vehicle through the control bracket. Also, if one control bracket is provided between the push rod, and the clutch pedal and brake pedal, it is possible to construct a pedal retraction amount control apparatus which presses one control bracket with the push rod at the moment of head-on collision, and rocks this control bracket to move the tread portions of both the clutch pedal and the brake pedal in the forward direction of the vehicle.

Also, the above description took as an example the case where the control bracket 45 is pressed by an approximately cylindrical push rod 24. However of course the member is not limited to being cylindrical and it is also possible to press the control bracket with a plate member.

In addition, the above description took as an example the case where the push rod 24 is connected to the damper housing 25. However, any component may be connected to the push rod 24 if the component is installed in the forward side of the vehicle and it moves back into the passenger compartment at the moment of head-on collision of the vehicle, for example a panel, a bracket, the engine, the transmission, the suspension and so on.

As described in detail above, according to the pedal retraction amount control apparatus of the first aspect of the present invention, if the pushing member is moved from the forward to the rearward direction of the vehicle, and even when the push member is moved in the rearward direction of the vehicle in a condition inclined in the longitudinal direction of the vehicle, the control bracket provided between the pushing member and the pedal receives the pushing member in the surface contact state. Therefore, the control bracket reliably receives movement of the pushing member in the rearward direction of the vehicle and rocks, and pushes the upper part of the pedal above the pivot in the rearward direction of the vehicle to move the tread portion of the pedal in the forward direction of the vehicle. Consequently, the tread portion of the pedal can be reliably moved in the forward direction of the vehicle when the collision of the running vehicle takes place in any forms of collision. Also, because the control bracket receives a face of the pushing member, the pressing of the pushing member can be transmitted to the pedal even if the positional relationship between the pedal and the pushing member were to shift. As a result, the degree of freedom in the positioning between the pedal and the pushing member can be increased.

According to the pedal retraction amount control apparatus of the second aspect of the present invention, in the case where the vehicle has a head-on collision, when the component on the forward side of the vehicle moves in the rearward direction of the vehicle, the pushing member also moves in the rearward direction of the vehicle, and the control bracket provided between the pushing member and the pedal reliably receives this movement of the pushing member and rocks, and presses the upper part of the pedal above the pivot in the rearward direction of the vehicle to move the tread portion of the pedal in the forward direction of the vehicle. Consequently, in the case where the vehicle has a head-on collision, the tread portion of the pedal can be reliably moved in the forward direction of the vehicle.

According to the pedal retraction amount control apparatus of the third aspect of the present invention, since the pushing member is unlikely to be deformed by an influence of the panel deformation at the moment of a head-on collision of the vehicle, the pushing member reliably moves the control bracket in the rearward direction of the vehicle. Especially in the case of an offset head-on collision where the vehicle is deformed in an offset manner in one side in the transverse direction, when the damper housing provided on the same side moves in the rearward direction of the vehicle, the pushing member also moves in the rearward direction of the vehicle, and the control bracket provided between the pushing member and the pedal reliably receives this movement of the pushing member in the rearward direction of the vehicle, and rocks, pressing the upper part of the pedal above the pivot in the rearward direction of the vehicle to move the tread portion of the pedal in the forward direction of the vehicle. Consequently, in the case where the vehicle has an offset head-on collision where the vehicle is offset to one side in the transverse direction, the tread portion of the pedal can be reliably moved in the forward direction of the vehicle.

According to the pedal retraction amount control apparatus of the fourth aspect of the present invention, when the pushing member moves in the rearward direction of the vehicle, rocks the control bracket, and presses the upper part of the pedal above the pivot in the rearward direction of the vehicle to move the tread portion of the pedal in the forward direction of the vehicle, the pedal and the control bracket are engaged by the engaging portions so that a state in which rotation of the pedal is restricted results. Consequently, the pedal no longer returns to the passenger compartment side after a collision.

According to the pedal retraction amount control apparatus of the fifth aspect of the present invention, because the control bracket is attached to a support bracket which rotatably supports the pedal, the support bracket and the control bracket can be mounted to the vehicle at one time by pre-attaching the control bracket to the support bracket. Consequently, man-hours for the assembly can be reduced.

According to the pedal retraction amount control apparatus of the sixth aspect of the present invention, since the upper part of the control bracket is secured to the dash panel in a cantilevered condition supported at the engaging section, this simple joining structure makes it possible for the control bracket to rock.

According to the pedal retraction amount control apparatus of the seventh aspect of the present invention, because the pushing member is passed through the through hole formed in the dash panel, the pushing member can be easily moved in the rearward direction of the vehicle. Also, because there is provided the cover member which closes the gap between the through hole and the pushing member, the engine room and the passenger compartment can be sealed, so that a decrease in air conditioning performance can be prevented, noise can be blocked, and a reduction in watertightness can be prevented.

According to the pedal retraction amount control apparatus of the eighth aspect of the present invention, because the cover member comprises a soft resilient member, vibration passing through the pushing member is absorbed by the cover member and the transmission of the vibration to the passenger compartment side can be suppressed. In addition, because of adhesion of the cover member with the dash panel there is a waterproofing function, and mounting is simplified.

According to the pedal retraction amount control apparatus of the ninth aspect of the present invention, because the cover member comprises a frangible member, it can be attached by welding or the like. Also, because the cover member has clearance between itself and the pushing member, it is possible to prevent vibration propagated through the pushing member from transmitting to the passenger compartment through the cover member.

What is claimed is:

1. A pedal retraction amount control apparatus for a vehicle which has a dash panel which separates a passenger compartment from a front compartment; a damper housing provided in the front compartment; and a pedal rotatably supported by a pivot and including a tread portion at a lower part thereof, below the pivot; the pedal retraction amount control apparatus comprising:

a pushing member of which one end is connected to the damper housing while another end extends from the front compartment to the passenger compartment through a through hole formed in the dash panel; and a control bracket which is arranged between the pushing member and the pedal, and has a receiving section and a push section, wherein:

the receiving section has a face for receiving the pushing member in a surface contact state; a main plate having said face thereon; a connecting portion rotatably connecting the control bracket to the dash panel; and plates extending in a forward direction of the vehicle from all the edges of the main plate such that said face reliably receives the rearwards movement of the pushing member; and the push section fixed to a rear side of the receiving section so that an inclined face thereof faces an upper part of the pedal above the pivot, and wherein:

a rearwards movement or a deformation of the damper housing is directly transferred to the pedal through the pushing member and the control bracket, so as to press the upper part of the pedal, above the pivot in the rearward direction of the vehicle; and said plates surround around said another end of the pushing member when the another end pushes said face.

2. A pedal retraction amount control apparatus according to claim 1, wherein said pushing member is connected to an inner side surface of the damper housing, which faces a center of the vehicle in a car width direction.

3. A pedal retraction amount control apparatus according to claim 1, wherein each of said pedal and said control bracket further comprises an engaging portion which engages with each other when said control bracket rocks and presses to upper part of said pedal above the pivot.

4. A pedal retraction amount control apparatus according to claim 1, wherein said control bracket is provided in a support bracket, which rotatably supports said pedal.

5. A pedal refraction amount control apparatus according to claim 1, further comprising:

a covering member which closes a gap between said through hole and said pushing member.

6. A pedal retraction amount control apparatus according to claim 5, wherein said covering member comprises a resilient member.

7. A pedal retraction amount control apparatus according to claim 5, wherein said covering member comprises a frangible member, and has a clearance between itself and said pushing member.

* * * * *